(12) United States Patent
Baikie

(10) Patent No.: US 6,238,715 B1
(45) Date of Patent: May 29, 2001

(54) CHEW TOY FOR DOGS AND METHOD OF MAKING THE SAME

(76) Inventor: Robert Scott Baikie, 1211 N. McCadden Pl. Apt. 301, Los Angeles, CA (US) 90038

( * ) Notice: Subject to any disclaimer, the term of this patent is extended or adjusted under 35 U.S.C. 154(b) by 0 days.

(21) Appl. No.: 09/412,120

(22) Filed: Oct. 5, 1999

Related U.S. Application Data

(60) Provisional application No. 60/118,409, filed on Feb. 2, 1999.

(51) Int. Cl.[7] ........................................................ A23L 1/31
(52) U.S. Cl. .......................... 426/92; 426/262; 426/573; 426/576; 426/577; 426/578; 426/601; 426/657; 426/805
(58) Field of Search .............................. 426/92, 573, 805, 426/657, 262, 601, 576, 577, 578

(56) References Cited

U.S. PATENT DOCUMENTS

| | | | | |
|---|---|---|---|---|
| 3,567,459 | * | 3/1971 | Wruk | 99/2 |
| 3,899,607 | * | 8/1975 | Miller et al. | 426/285 |
| 3,916,029 | * | 10/1975 | Hildebolt | 426/94 |
| 4,260,635 | * | 4/1981 | Fisher | 426/3 |
| 4,536,494 | | 8/1985 | Franklin | 514/31 |
| 4,674,444 | | 6/1987 | Axelrod | 119/29.5 |
| 4,771,733 | | 9/1988 | Axelrod | 119/29.5 |
| 4,822,626 | * | 4/1989 | Spanier et al. | 426/94 |
| 4,904,495 | * | 2/1990 | Spanier | 426/646 |
| 5,084,297 | * | 1/1992 | Merrick | 426/641 |
| 5,339,771 | | 8/1994 | Axelrod | 119/710 |
| 5,485,809 | | 1/1996 | Carroll | 119/710 |
| 5,532,010 | * | 7/1996 | Spanier et al. | 426/94 |
| 5,635,237 | * | 6/1997 | Greenberg et al. | 426/646 |
| 5,895,680 | | 4/1999 | Cirigliana et al. | 426/326 |
| 5,897,893 | | 4/1999 | Mohilef | 426/89 |
| 5,902,579 | | 5/1999 | Eisenschink et al. | 424/93.43 |
| 5,989,604 | * | 11/1999 | Wolf et al. | 426/103 |
| 6,117,477 | * | 9/2000 | Paluch | 426/623 |

OTHER PUBLICATIONS

Product Alert, vol. 26, No. 3, "Rollover Lamb Treats", Feb. 1997.*

Product Alert, vol. 14, No. 24, "Vitakraft Torros dog snacks", Dec. 1997.*

* cited by examiner

Primary Examiner—Chhaya D. Sayala
(74) Attorney, Agent, or Firm—Fred C. Hernandez; Eric Karich

(57) ABSTRACT

A animal product filled chew toy for dogs comprises a relatively hard hollow casing. A relatively soft animal product filling that includes a preservative, a gelling agent, an animal fat and a meat is contained within the hollow casing. The toy also preferably includes a mold inhibitor.

3 Claims, 1 Drawing Sheet

CHEW TOY FOR DOGS AND METHOD OF MAKING THE SAME

RELATION TO OTHER APPLICATION

This application claims priority from pending provisional application 60/118,409, filed Feb. 2, 1999, with the same title for any commonly disclosed subject matter.

TECHNICAL FIELD

The present invention relates generally to chew toys for dogs, and more particularly to chew toys for dogs that include an animal product filling surrounded by a relatively hard casing.

BACKGROUND ART

Chew toys for dogs perform several important functions. First, and most importantly, these toys facilitate several health functions, such as teeth and gum cleaning, gum massage and chewing exercise. Benefits of these functions include the prevention of periodontal disease and tartar buildup, as well as the promotion of healthy teeth and jaw development. Dogs often do not have access to natural bones and hard objects that scour their teeth when chewed and assist in healthy dental development, and owners must sometimes look to toys or snacks in order to fill this void. A variety of artificial chew toys have been created in an attempt to achieve these health benefits, with varying degrees of success. For instance, artificial chew toys have been made from rawhide, woven fibers, and ropes. However, these materials are often rapidly destroyed by the chewing action which breaks down the fibers and structure of the material, and the soft nature of these products cannot provide the same degree and variety of health benefits that can be obtained from chew toys that are comprised of harder material.

Another important function of chew toys is to divert destructive chewing behavior and to provide amusement and entertainment for the animal. Chew toys can provide an outlet for the animal to expend its chewing energies which might otherwise be directed in a destructive manner on household objects. The degree of acceptability of the toy by the animal will determine the effectiveness and success of the product in this regard. Additionally, the toy should have an appeal to the animal and offer a means of entertainment and amusement to keep the dog happy over time, preferably over long periods of time. Therefore, it should be appreciated that there exists a need for an improved chew toy that will generate a longer period of sustained interest by dogs, thereby imparting needed health and entertainment for the animal.

The present invention is directed to overcoming one or more of the problems set forth above.

DISCLOSURE OF THE INVENTION

A animal product filled chew toy for dogs comprises a relatively hard hollow casing. A relatively soft animal product filling that includes a preservative, a gelling agent, an animal fat and a meat is contained within the hollow casing.

BEST MODE OF CARRYING OUT THE INVENTION

Figure 1:
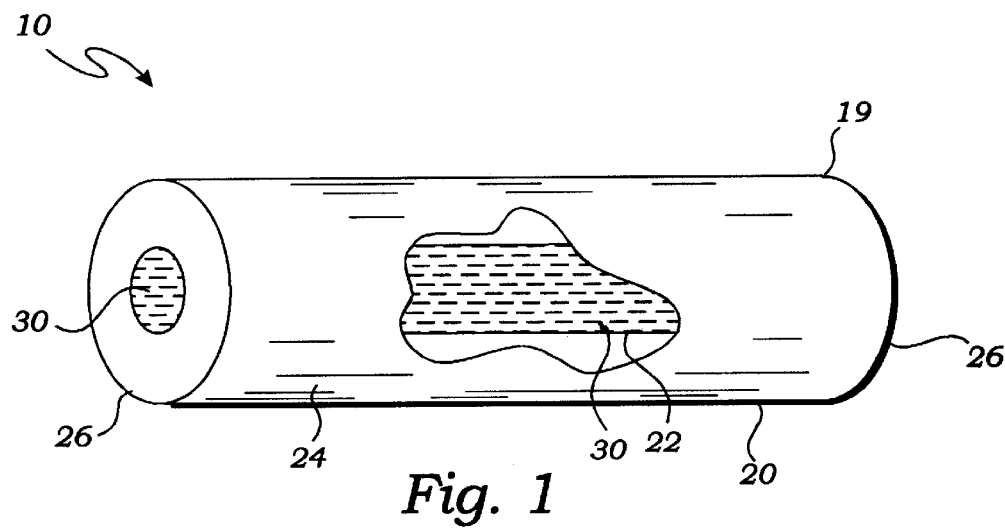
FIG. 1 is a sectioned top view of a chew toy for dogs according to the present invention.

Referring now to FIG. 1 there is shown a chew toy 10 for dogs according to the present invention. Chew toy 10 is comprised of a relatively hard hollow casing 19 and a relatively soft animal product filling 30. Hollow casing 19 is preferably a natural meat bearing bone 20, however, other casings, such as those comprised of a relatively hard synthetic or natural/edible material, could be substituted. Bone 20 is prepared for use by first removing the marrow contained within an inner region 22 and then thoroughly cleaned and sterilized. Cleaning and sterilization is preferably performed by cooking bone 20 in a low temperature oven over a period of about 10 hours. While other methods can be used, it is important that the cleaning and sterilizing steps are completed thoroughly to remove any bacteria or other contaminants from bone 20.

After being cleaned and sterilized, bone 20 is dipped in a smoke solution that is diluted to less than five percent to impart a dark brown color and smoky flavor to an outer surface 24. This color and taste combination is believed to be highly instrumental in initially attracting a dog's attention to the bone and in maintaining the dog's interest over a long period of time. Once the initial interest in chew toy 10 by the dog has been established, the dog can discover animal product filling 30. Filling 30 provides a second appeal enhancing feature that creates a heightened initial interest and sustained overall interest in the product over a long period of time as the dog attempts to extract filling 30 from inner region 22.

Filling 30 is created by combining a number of ingredients to a liquid and then bringing this mixture to a temperature of 175° Fahrenheit. While a preferred amount of each part of filling 30 will be provided, it should be appreciated that other percentages could be used without departing from the spirit of the invention. The first part of filling 30 is a liquid base, such as water that is brought to a boil. This base portion preferably does not exceed thirty percent of the filling mixture by weight. Next, a premix solution, preferably not exceeding fifteen percent on a dry weight basis, is added to the boiling liquid. Included in the premix is dextrose; a heat sensitive gelling agent, such as agar; salt; an acidulate, such as citric acid and a preservative, such as potassium sorbate. While all of these items could be mixed together prior to adding them to the boiling water, the citric acid and preservative are preferably added independently.

Once the premix solution is incorporated into the boiling liquid, an animal fat solution is added, preferably not to exceed ten percent per weight of filling 30. The animal fat solution preferably includes an animal fat, such as poultry fat; a preservative, such as polysorbate; a thickener, such as glycerin; and a mold inhibitor, such as natamycin. Addition of a mold inhibitor, such as natamycin, to filling 30 is desirable to help lengthen the life of chew toy 10 by preventing to possibility of mold growth on or in the toy. Not only will this prevent any animal illness associated with ingestion of mold, it will allow chew toy 10 to be enjoyed and used by the dog for a longer period of time because there will be no flavor distortion due to mold growth. Finally, a meat mixture is added which includes an animal meat, preferably a beef meal, and a sweetener, such as corn syrup. The meat mixture preferably comprises no more than forty-five percent of filling 30 on a dry matter basis.

Figure 2:
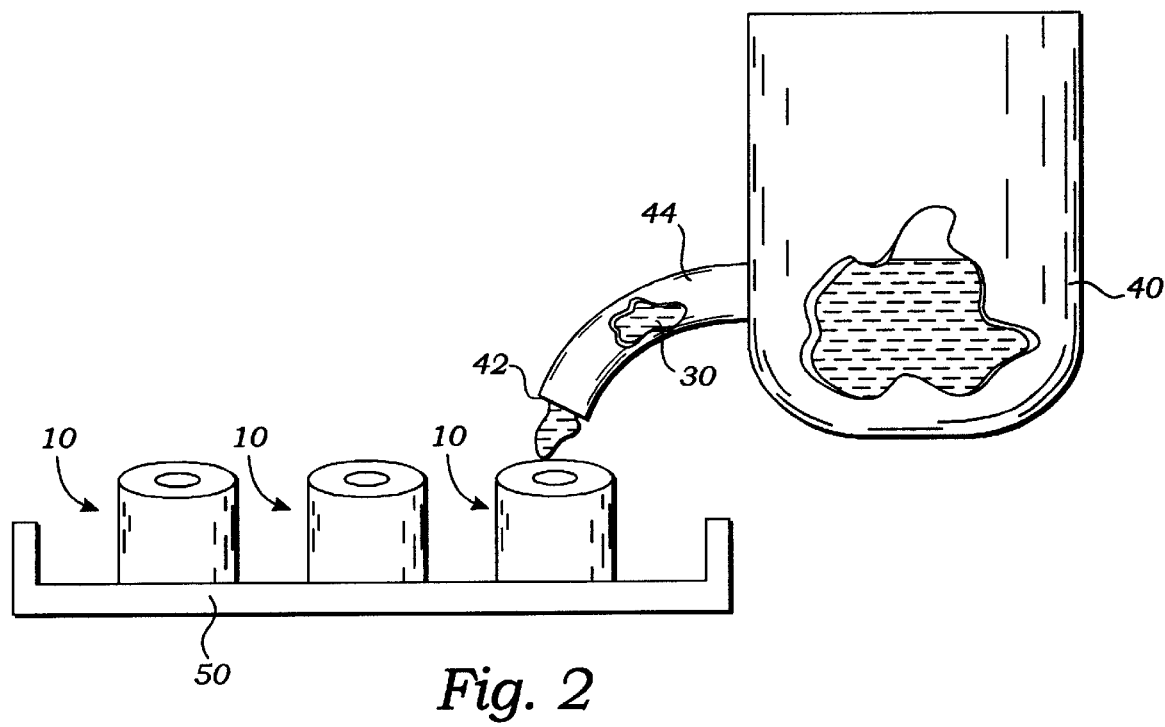
FIG. 2 is a sectioned side view of the processing apparatus used to prepare the present invention.

Once these ingredients have been combined, the aqueous mixture is brought to a temperature above 170°, preferably at least 175°, Fahrenheit and then transferred to a holding vat 40. Referring now in addition to FIG. 2, holding vat 40 includes a flow valve 42 and a tube 44. Flow valve 42 is adjustable to an open position in which filling 30 can flow out of tube 44 and a closed position in which tube 30 is blocked to prevent filling 30 from flowing out of tube 44. Bone 20 is then placed adjacent a free end 45 of tube 40, flow valve 42 is adjusted to its open position, and filling 30 is allowed to flow from holding vat 20 into inner region 22 of bone 20. Once inner region 22 is filled, flow valve 42 is adjusted to its closed position, thus ending the flow of filling from tube 44. Because filling 30 is an aqueous mixture when heated to this high temperature, bone 20 is preferably placed upright and supported by a tray 50 to prevent filling 30 from flowing out an end 26 of bone 20 during the filling process, as shown in FIG. 2.

After filling 30 has been positioned in inner region 22, it is allowed to reach room temperature. In other words, filling 30 is allowed to cool to below 90° Fahrenheit. As filling 30 cools to this temperature, it changes from an aqueous solution to one with a gelatin consistency. Bone 20 is then removed from tray 50 and excess filling is cleaned from ends 26 or outer surface 24. Finally bone 20 is sprayed with an aqueous solution containing natamycin, to prevent mold growth on the exterior of bone 20.

While the preferred method of positioning filling 30 within bone 20 has been disclosed, other methods could be employed. For instance, tray 50 could be filled with an amount of filling 30, not to exceed the height of bone 20. Once filling 30 beings to cool and convert to a gelatinous substance, bone 20 could be pressed into filling 30, such that an amount of filling 30 fills inner region 22. Once filling 30 was completely cooled and converted to a gelatinous mixture, bone 20 could be removed, cleaned and sprayed with natamycin. Thus it should be appreciated that a number of methods could be used to place filling 30 within bone 20.

It should be understood that the above description is intended for illustrative purposes only, and is not intended to limit the scope of the present invention in any way. For instance, while the present invention has been illustrated using natural bone, it should be appreciated that synthetic bones, such as those made from a plastic material could be substituted. Further, the animal product filling could be enhanced by a number of flavors that dogs enjoy, such as peanut butter or cheese and bacon, without departing from the spirit of the invention. Thus, those skilled in the art will appreciate that various modifications could be made to the disclosed embodiments without departing from the intended scope of the present invention, which is defined in terms of the claims set forth below.

What is claimed is:

1. A method of making an animal product filled chew toy for dogs, the chew toy comprising:

providing boiling water;

mixing a heat sensitive gelling agent into the boiling water;

adding an animal fat solution to the boiling water;

adding a meat mixture, heating the aqueous mixture to at least 170 degrees, thereby creating an animal product filling in liquid form;

providing a hard hollow casing having an inner region;

cleaning and sterilizing the hard hollow casing;

pouring the animal product filling into the inner region of the hard hollow casing; and cooling the animal product filling until the heat sensitive gelling agent solidifies the animal product filling.

2. The method of claim 1 wherein the hard hollow casing is natural meat bearing bone.

3. The method of claim 2 wherein the natural meat bearing bone is dipped in a smoke solution.

* * * * *